UNITED STATES PATENT OFFICE.

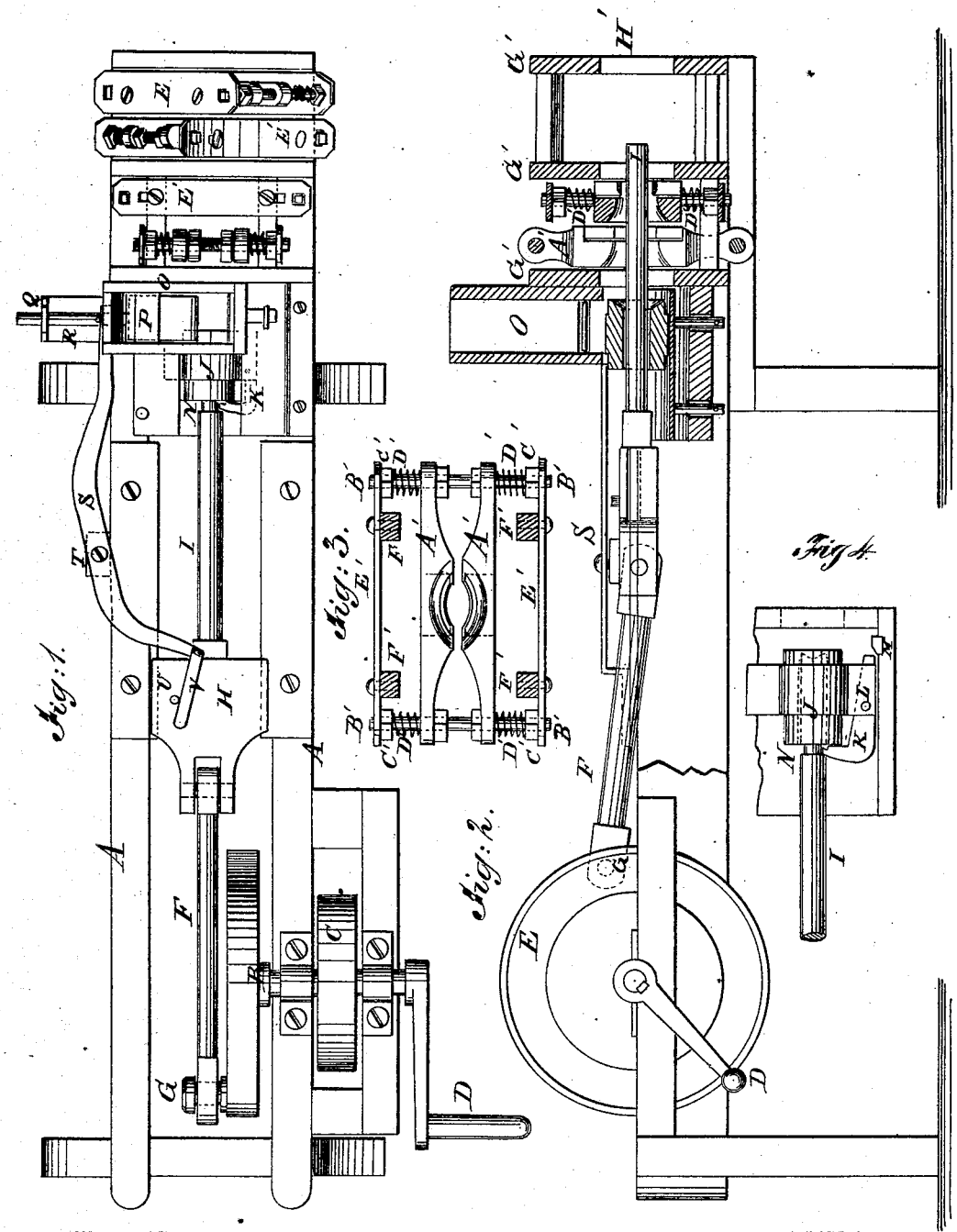

WILLIAM J. POTTER, OF MOUNT LEBANON, N. Y., ASSIGNOR TO HIMSELF AND ROBERT M. WAGEN, OF SAME PLACE.

IMPROVEMENT IN GREEN-CORN CUTTERS.

Specification forming part of Letters Patent No. 160,119, dated February 23, 1875; application filed January 18, 1875.

*To all whom it may concern:*

Be it known that I, WILLIAM J. POTTER, of Mount Lebanon, in the county of Columbia and State of New York, have invented a new and useful Improvement in Machine for Cutting Green Corn from the Cob, of which the following is a specification:

The invention will first be fully described, and then pointed out in the claims.

In the accompanying drawing, Figure 1 is a top or plan view. Fig. 2 is a detail showing the construction of the cutters. Fig. 3 is a side view, partly in section. Fig. 4 is a detail of the plunger and parts connected therewith.

Similar letters of reference indicate corresponding parts.

This machine is mounted on a frame, A, of suitable form and construction. B is the driving-shaft, and C is a driving-pulley; but the machine may be propelled by the crank D. E is a crank-wheel on the end of driving-shaft. F is a pitman, which connects the wheel E (by the wrist-pin G) with the cross-head H. I is the plunger-rod, and J is the plunger. K is a dog-lever, which works on the pin L of the plunger. M is a stationary cam, which, as the plunger moves toward the knives, the inner end of the dog strikes, and throws the other end from the groove N in the plunger-rod, which allows the rod to pass through the plunger and force the cob forward to and past the knives. As the plunger-rod returns the end of the dog is thrown into the groove by a spring, which bears upon it with a constant pressure, and then the plunger is drawn back at each stroke of the machine past the hopper. O is the hopper, which receives the ears of corn, (in a horizontal position,) the butts of the ears always being from the knives, or to the right of the attendant. P is the feeder, which consists of a curved plate, having a projecting stem, Q, on which there is a spring, R, which bears the plate forward with a constant pressure. The plate is given an intermittent motion by means of the bar S, which works on the pin T. One end of this bar operates upon a pin in the stem of the feeder-plate, to force the plate back. The other end curves round onto the cross-head, and is acted upon by the pin U. The end V of the bar is bent to such an angle with the plunger-rod that when the cross-head returns the pin U strikes it and draws the end of the bar inward, and thereby throws the feed-plate outward against the force of the spring R. The front top edge of the feed-plate P is curved downward to allow the ears of corn to slip off. The ears of corn are forced toward the knives by the plunger, and the cob is forced through between the knives by the plunger-rod. The knives or cutters are four (more or less) pairs in number, attached to jaws A', which jaws are made adjustable on the rods B' by means of the screw-nuts C' and the springs D'. E' are plates attached to the blocks F', which blocks are fast to the partition G'. Each pair of knives, it is seen, is attached to an adjustable frame, and the frames are placed at right angles with each other. The two knives of each pair form an oval opening, substantially as seen in Fig. 2. These oval openings are placed at right angles, or at any other angle with each other which will allow the knives to cut all the corn from the cob. The knives are gaged to split the kernels; the first pair cut less than the next, while last pair cut the kernels clean from the cob, and the cob is forced out through the opening H' at the end of the machines. The inner ends of the plunger and rod are made concave, to enable them to embrace the butt of the ear. The ears of corn are fed in by hand, one or more at a time, and every stroke of the plunger cleans the corn from the cob and divides the kernels into two or more pieces, according as the knives may be graduated.

Green corn cut in this manner and dried is becoming an important article of diet, it being palatable, healthy, and nutritious.

Having thus described my invention, what I claim as new, and desire to secure by Letters Patent, is—

1. The combination, with hopper O, of the hollow plunger J, concaved in front to center the ear, and carrying it forward to the knives, and the rod I moving therethrough and pushing the cob completely past the knives, as and for the purpose specified.

2. The combination, with hollow plunger J and rod I, having groove N, of the lever K, arranged to operate as and for the purpose specified.

3. The combination, with hopper O, of an intermittently-moving bottom, P, that feeds the ear, in the manner described.

4. The lever S, having one end, V, operated by a pin, U, on the reciprocating cross-head H, and the other attached to the shank of spring-pressed plate P, as and for the purpose specified.

WILLIAM J. POTTER.

Witnesses:
CLEMENCE W. BULL,
HAMPTON C. BULL.